United States Patent [19]

Bates et al.

[11] Patent Number: 5,566,151
[45] Date of Patent: Oct. 15, 1996

[54] OPTICAL DEVICES HAVING ARRAY DETECTORS WITH LIGHT RECEIVING PHOTO ARRAYS LARGER THAN AN INCIDENT LASER BEAM CROSS-SECTION

[75] Inventors: Allen K. Bates; Masud Mansuripur, both of Tucson, Ariz.

[73] Assignee: International Business Machines Corporation, Armonk, N.Y.

[21] Appl. No.: 474,594

[22] Filed: Jun. 7, 1995

[51] Int. Cl.$^6$ .................................................. G11B 7/09
[52] U.S. Cl. .................. 369/44.27; 369/44.25; 369/44.23
[58] Field of Search ................ 369/44.23, 44.24, 369/44.25, 44.27, 44.32

[56] References Cited

U.S. PATENT DOCUMENTS

| | | | |
|---|---|---|---|
| 4,612,437 | 9/1986 | Ohsato | 250/201 |
| 4,631,397 | 12/1986 | Ohsato | 250/201 |
| 4,888,476 | 12/1989 | Zucker | 369/44.27 X |
| 4,945,529 | 7/1990 | Ono et al. | 369/109 |
| 4,970,710 | 11/1990 | Lee | 369/44.11 |
| 5,113,386 | 5/1992 | Whitehead et al. | 369/44.11 |
| 5,134,602 | 7/1992 | Baca et al. | 369/44.27 |
| 5,195,072 | 3/1993 | Fukui et al. | 369/44.11 |
| 5,351,230 | 9/1994 | Takeda et al. | 369/112 |

FOREIGN PATENT DOCUMENTS

| | | | |
|---|---|---|---|
| 60-177436 | 9/1985 | Japan | 369/44.27 |
| 62-256239 | 11/1987 | Japan | 369/44.27 |
| 63-288430 | 11/1988 | Japan | 369/44.27 |
| 1-003829 | 1/1989 | Japan | 369/44.27 |

OTHER PUBLICATIONS

Born et al Principles of Optics, Permagon Press, 1975, pp. 416–417 and 440–441.
Texas Instruments, TMS320C5x User's Guide, Jan. 1993, pp. 1–1, 1–6 through 110, 3–4 and F–20.
Bernacki et al "Diffraction Analysis and Evaluation of Several Focus–and Track–Error Detection Schemes for Magneto–Optical Disk Systems", SPIE vol. 1663 Optical Data Storage, 1992 pp. 150–156, (1992).

Primary Examiner—Aristotelis Psitos
Assistant Examiner—Duncan Wilkinson
Attorney, Agent, or Firm—D. A. Shifrin; H. Sommermeyer

[57] ABSTRACT

An optical device has an optical array detector with an array of optical receptors (each receptor is an individual photo detector) that has a greater cross-sectional extent than an impinging light beam. The receptors have respective light receiving areas smaller than the a cross-sectional area of the impinging light beam. A ring lens passes a received light beam to the receptor array. A ring lens refracts a defocused and off-track impinging light beam whereby the optical refractive properties of the ring lens change the cross-sectional form of the received light beam in accordance with status of the light beam. Refraction of the received light beam in the ring lens distorts the beam cross-sectional shape for indicating focus and location errors. Provisions are made for automatic calibration of the impinging beam to a current position of the array detector physical position by the optical device. Optical detection and re-calibration is effected by a digital signal processor.

36 Claims, 6 Drawing Sheets

OPTICAL DEVICES HAVING ARRAY DETECTORS WITH LIGHT RECEIVING PHOTO ARRAYS LARGER THAN AN INCIDENT LASER BEAM CROSS-SECTION

FIELD OF THE INVENTION

This invention relates to optical device laser read beam-processing including automatic calibration of impinging light beams to a detector having an array of photo receptors substantially larger than the light means and photo receptors substantially smaller than the light beam and for detecting predetermined signal conditions.

BACKGROUND OF THE INVENTION

Presently there are a variety of focusing and tracking servo apparatus used in optical devices. Many of these optical devices employ astigmatic principles for tracking and focus error detection. Even though the read laser beam floods the detector (all photo elements of each detector must receive light), device operation requires that the center of a laser read beam impinge on the detector with the center axis(es) of the read beam being aligned with a center axis(es) of the detector. Such optical apparatus require accurate initial calibration of detector physical location with respect to the optical disk. Such physical mounting is subject to unintended physical mounting changes that may result in subsequent unwanted focusing and tracking error offsets. Such astigmatic detectors have a small plurality of individual photo responsive sections or receptors requiring accurate physical calibration and alignment of the beam and detector. As optical recording areal densities continue to increase, such minor offsets become more significant and initial alignment has more precise physical mounting tolerances. Unintended mounting changes may be caused by shock, temperature changes and the like.

Another approach to focusing and tracking servo apparatus in optical devices involves using a ring lens to project a laser beam unto a circular symmetric photo detector. A ring lens, in general, consists of an optical torus through which collimated light traveling into the ring lens is converted into an annulus of light. When the collimated light is subjected to defocus, then a portion of the light is refracted changing shape of or modulating the annulus. Defocus caused by an objective lens being too close to a focal plane results in the annulus growing in a first radial direction while defocus caused by an objective lens being too far from a focal plane causes the annulus to grow in a second or opposite radial direction. In general, any variation or modulation of the incoming light beam from ideal collimation results in the ring lens refracting the beam in a manner indicative of the modulation. The light output of a ring lens is circularly symmetrical providing enhanced stability of servo mechanism operation when compared with the usual astigmatic focus and tracking systems. Circular symmetry is a special case of uniaxial and multi-axial symmetry. In practicing the present envision it is desired to use circularly symmetrical light for obtaining a best result.

Using a ring lens with a circularly symmetrical detector also requires a precise manufacturing physical adjustment procedure for carefully aligning the ring lens with the circularly symmetrical detector. It is desired to provide a stable servo apparatus with relatively easy manufacturing alignment procedures. For removing undesired signal offsets due to detector unintended misalignments in servo mechanisms, automatic accommodation of such detector misalignment is desired without resorting to any physical adjustment in the detectors mounting.

DISCUSSION OF PRIOR ART

Born and Wolf in PRINCIPLES OF OPTICS, Permagon Press, 1975, in pages 416–417 and 440–441 discuss annular apertures and central obstruction of light beams. This discussion relates to early work prior to the so-called now known ring lens.

Bernacki and Mansuripur in "Diffraction Analysis and Evaluation of Several Focus- and Track- Error Detection Schemes for Magneto-Optical Disk Systems", SPIE Vol. 1663 OPTICAL DATA STORAGE, 1992 pp 150–156, discus tracking and focus servo systems. Included in this paper are discussions of astigmatic systems and a ring toric lens/push-pull system.

Ohsato, in U.S. Pat. Nos. 4,612,437 and 4,631,397, show focus error systems. Ohsato shows a lens having first and second regions respectively with different back focal lengths and spaced apart optical axes. Focus error detection appears to be based on differential spot sizes from the respective lens regions as projected on a photo detector having plural photo regions.

Yamanaka et al, in U.S. Pat. No. 4,945,529, show a diffraction grating and plural detector elements producing a focus error signal.

Lee, in U.S. Pat. No. 4,970,710, shows a Fresnel zone plate generating plural optical beams from an input optical beam. Two embodiments are described by Lee. A Fresnel zone plate refracts an incoming light beam.

Fukui et al, in U.S. Pat. No. 5,195,072, show a variation of astigmatic focus error apparatus. Fukui et al show a quadrant Fresnel zone plate system for refracting collimated light.

Whitehead et al, in U.S. Pat. No. 5,113,386, show a four element photo detector. A spot size detection scheme generates a focus error signal. Specific beam shaping and masking elements are employed to reduce optical feed through.

Takeda et al, in U.S. Pat. No. 5,351,230, show a plurality of Fresnel zone plates having rectilinear gratings. An eight element photo detector is employed for generating focus error signals (FES).

Japan published document 60-93642, May 25, 1985, discloses apparatus in the drawing that apparently uses a Fresnel zone plate diffraction grating for generating optical servo signals.

Digital signal processors (DSP) are used for processing audio and other types of electrical signals. An example of such a DSP is shown in the Texas Instrument TMS320C5x Users Guide, revision D dated January 1993.

SUMMARY OF THE INVENTION

The present invention provides stable servo signals and automatic realignment of detector operations in an optical device. A symmetrically shaped laser beam, such as a laser beam having an annular circular cross-section, is preferably employed for generating servo error signals by detecting modulation components caused in the shaped laser beam by servo errors. Such detection may also be used for detecting modulation components for indicating diverse information.

It is an object of the present invention to replace time-consuming mechanical alignment and calibration of a photo detector to an impinging detectable laser beam with automatic electronically effected laser beam alignments and calibrations that are independent, within a given set of physical tolerances, of a fixed-mount optical detector physical location.

An array detector has a light-beam receiving array of photo receptors, each photo receptor is an individual photo detector. The array has a light receiving extent substantially greater than a cross-sectional extent of an impinging light beam. Each photo receptor has a size substantially smaller than the light beam cross-sectional extent. The focal and impingement locations and shapes of the detectable light beam on the array of receptors are automatically determined and used for detecting modulation in the impinging light beam.

In a specific form of the invention, the extent of the array of receptors is at least twice the size of the detectable light beam cross-section. It is preferred that the size of each photo receptor be at least an order of magnitude smaller than the cross-sectional size of the detectable light beam.

A ring lens, or other non-collimated light refracting element, converts a received laser beam to a detectable beam having an annular cross-sectional shape. The detectable beam has predetermined symmetry, such as circular or bi-axial symmetry. It is preferred that the detectable beam be circularly symmetrical and exhibit an annular area of high light intensity.

Focus and tracking errors for optical disks and the like are detectable using the automatically aligned detectable beam. A change in the radius of the detectable beam indicates a focus error. A change in the beam cross-section light intensity along one axis of the beam indicates tracking errors.

The foregoing and other objects, features and advantages of the invention will be apparent from the following more particular description of preferred embodiments of the invention, as illustrated in the accompanying drawings.

DETAILED DESCRIPTION

Figure 1:
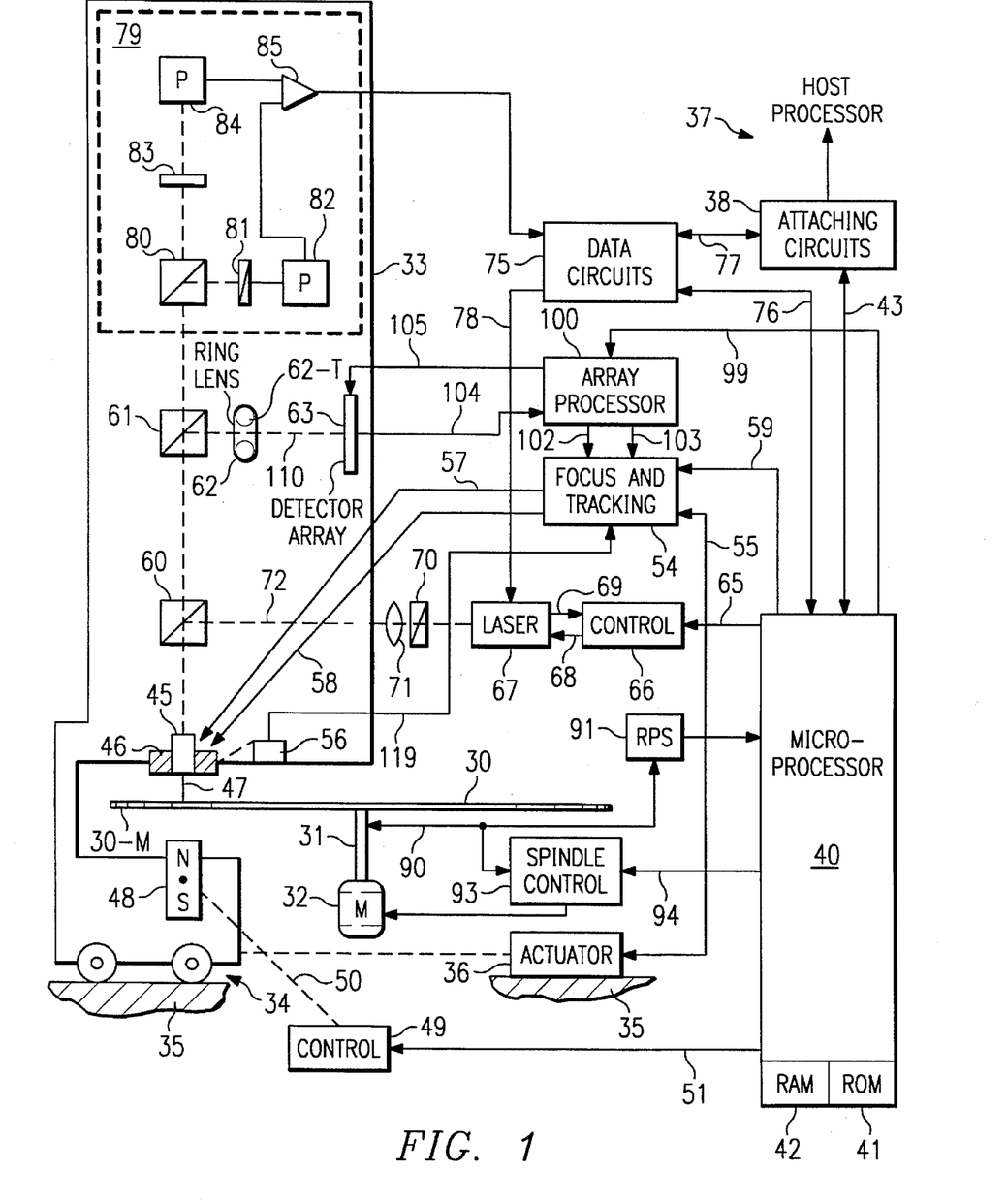
FIG. 1 illustrates, in a simplified form, an optical disk device having an early embodiment of the present invention.

Referring now more particularly to the appended drawing, like numerals indicate like parts and structural features in the various figures. FIG. 1 diagrammatically illustrates a magneto optical device that employs the present invention. A magneto optic record disk 30 is mounted on spindle 31 for rotation by motor 32. Optical head-carrying arm 33 on head-arm carriage generally denoted by numeral 34, moves radially of disk 30. A frame 35 of recorder suitably mounts carriage 34 for reciprocating radial motions. The radial motions of carriage 34 enable access to any one of a plurality of concentric tracks or circumvolutions of a spiral-groove indicated data track for recording and recovering data on and from the disk. Linear actuator 36, suitably mounted on frame 35, radially moves carriage 34 for enabling track accessing. The recorder is suitably attached to one or more host processors 37, such host processors may be control units, personal computers, large system computers, communication systems, image process processors, and the like. Attaching circuits 38 provide the logical and electrical connections between the optical device and the attaching host processors 37.

Microprocessor 40 controls the optical device including the attachment to the host processor 37. Control data, status data, commands and the like are exchanged between attaching circuits 38 and microprocessor 40 via bidirectional bus 43. Included in microprocessor 40 is a program or microcode storing, read-only memory (ROM) 41 and a data and control signal storing random access memory (RAM) 42.

The optics of the optical device include an objective or focussing lens 45 mounted for focussing and tracking motions on head-arm 33 by fine actuator 46. This actuator includes mechanisms for moving lens 45 toward and away from disk 30 for focussing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magneto optic recording, magnet 48 (in a constructed embodiment magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magneto optic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is mechanically coupled to rotatable magnet 48 as indicated by dashed line 50, controls the write and erase directions.

Microprocessor 40 supplies control signals over line 51 to control 49 for effecting reversal of the recording direction.

It is necessary to control the radial position of the beam following path 47, such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, circuits 54 control signals travel over lines 57 and 58, respectively, for focus and fine tracking and switching actions of fine actuator 46. Lines 57, 58 respectively carry a tracking error signal TES to circuits 54 and a position control signal from circuits 54 to the focus and tracking mechanisms of actuator 46. Sensor 56 senses the relative position of fine actuator 46 to head-arm carriage 33.

In accordance with one aspect of the present invention, an axial distortion of light intensity in the detectable beam (a modulation component caused by a tracking error) indicates a tracking error. This indication is used to generate a tracking error signal TES. The focus and tracking position sensing is achieved by analyzing laser light reflected from disk 30 over path 47, thence through lens 45, through one-half mirror 60 and to be reflected by half-mirror 61 to elements added to the optical device in accordance with the present invention. Such reflected light beam has a somewhat circular cross-section, that may be oblong, circular, exhibit diverse forms of biaxial asymmetry, as well as other cross-sectional distortions (modulation components) from a perfect circular cross-section. Ring lens 62, or any other optical device that responds to collimated light as described herein or as found with known ring lenses, converts the read laser beam reflected by beam splitter 61 to have an annular cross-section (FIG. 2), herein termed detectable beam 110. The term annular includes an annulus of any cross-section having at least biaxial symmetry when the light beam is in focus and on track and the beam having a higher light intensity than a center portion. The center portion need not be entirely devoid of light. The detectable beam leaves ring lens 62 to impinge on later-described array detector 63.

In accordance with an aspect of this invention, array detector 63 has a larger light-receiving area or extent greater than an expected cross-sectional size (FIG. 2) of the annular circularly symmetrical detectable beam 110. This fact means that array detector 63 has a plurality of light receptors (separate photo detectors) outside of the annulus that receive no light from the detectable beam. A desirable characteristic of a circular symmetrical beam produced by a ring lens 62 is that out-of-focus and data tracking errors distort or modulate the circular symmetry in two different ways. Focus errors distort (modulate) light annulus 111–113 (FIG. 4) by shifting the outer circumference of the light annulus either outwardly indicated by arrow 136 or the inner circumference of the light annulus inwardly indicated by arrow 137. Track following errors uniaxially distort or modulate the light intensity distribution of annulus 111–113 along a radial axis of disk 30 indicated by double-headed arrow 141. For a track following error in a first radial direction of disk 30, area 135 of light annulus 111–113 is reduced in intensity. Likewise, for a track following error in a second radial direction, opposite to the first radial direction, area 136 constituting an area radially opposite (along axis 141 of the light annulus) to area 135 of the light annulus 111–113 has reduced light intensity. Axis 140 of light annulus 111–113 is tangential to the tracks on disk 30, hence double-headed arrow 141 is radially aligned with disk 30 surfaces. Therefore both focus and track errors are detected. Array processor AP 100 receives array signals from array detector 63 for generating focus error signals (FES) and tracking error signals (TES) respectively traveling over lines 102 and 103 to focus and tracking circuits 54. Focus and tracking circuits 54 are usual focus and tracking circuits employed in optical devices.

In accordance with another aspect of this invention, AP 100 also automatically electronically calibrates, in situ, detectable beam 110 impingement on array detector 63 to a current physical location of array detector 63. Such in situ automatic calibration facilitates manufacture of optical devices in that a fixed mechanical mount rather than the usual adjustable detector mounting can be employed. In the event array detector 63 was unintentionally misaligned after an initial alignment resulting in undesired servo signal offsets, then in situ automatic calibration accommodates such unintended misalignment. In this automatic re-calibration process, AP 100 receives later-described array electrical signals from array detector 63 for generating a new set of beam impingement parameters replacing the initially calibrated impingement parameters for array detector 63. The re-calibrated array detector 63 then more faithfully produces control and error signals, such as FES and TES. Each current calibrated array detector 63 pattern three-dimensionally and rotationally accommodates physical location changes of array detector 63. AP 100 then uses the calibrated impinging beam pattern information for controlling array detector 63.

Recording or writing data onto disk 30 is next described. It is assumed that magnet 48 or equivalent coil field polarity is rotated to the desired position for recording data. Microprocessor 40 supplies a control signal over line 65 to laser control 66 for indicating that a recording operation is to ensue. This means that laser 67 is energized by control 66 to emit a high-intensity, laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium arsenide diode laser, can be modulated by data signals so the emitted light beam represents the data to be recorded by intensity modulation. In this regard, data circuits 75 (later described) supply data-indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplied control signals over line 76. Microprocessor 40 in preparing circuits 75 is responding to commands for recording received from a host processor 37 via attaching circuits 38. Once data circuits 75 are prepared, data are transferred directly between host processor 37 to data circuits 75 through attaching circuits 38. Data circuits 75 also includes ancillary circuits (not shown) relating to disk 30 format signals, error detection and correction and the like. Circuits 75, during a read or recovery action, strip the ancillary signals from the read back signals before supplying corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect)

travels along the two-way light path 47, through lens 45 and half-mirrors 60 and 61 to the data detection portion 79 of the head-arm 33 optics. Half-mirror or beam splitter 80 divides the reflected beam into two equal intensity beams both having the same reflected rotated linear polarization. The half-mirror 80 reflected light travels through a first polarizer 81, which is set to pass only that reflected light which was rotated when the remnant magnetization on disk 30 spot being accessed hats a "north" or binary one indication. This passed light impinges on photo cell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner. While a magneto-optical disk 30 has been used in the illustrative embodiment, the present invention is equally applicable to all forms of optical disk recording techniques, such as ablative, color change and the like.

Figure 2:
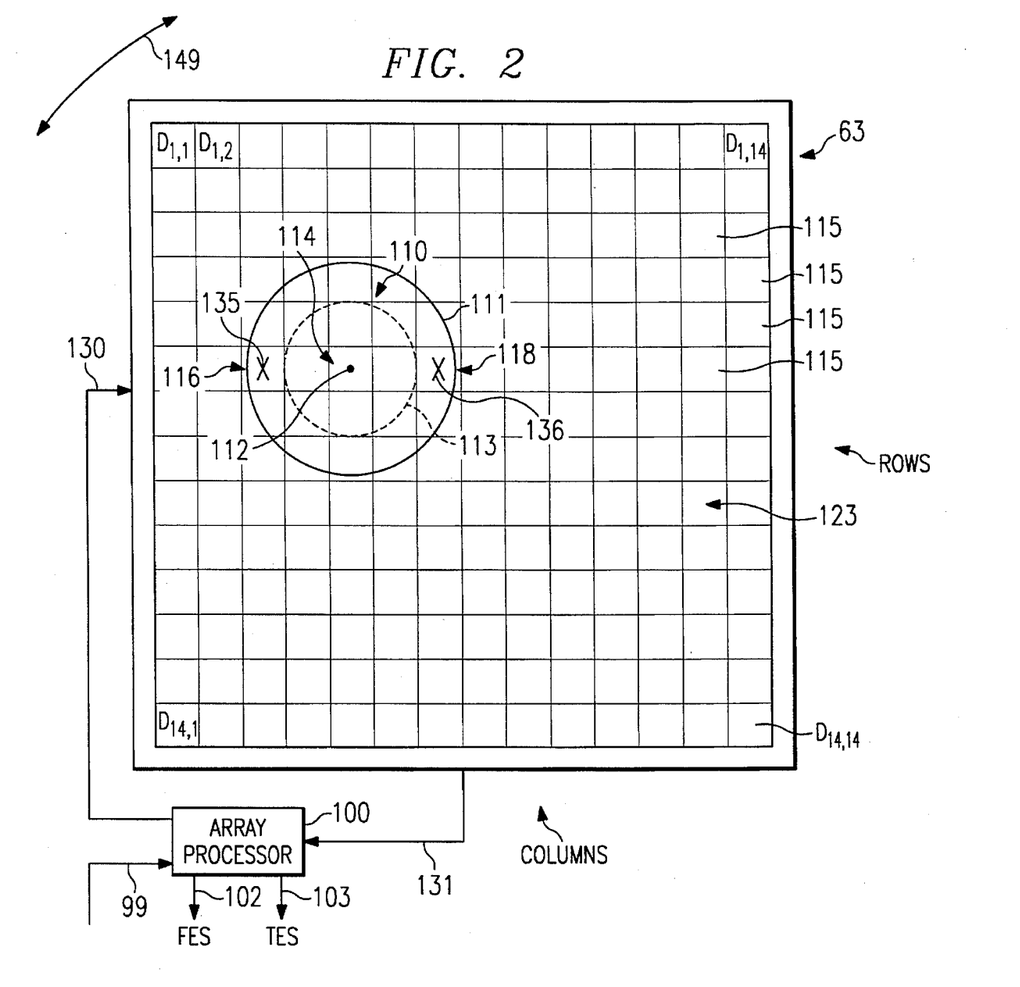
FIG. 2 is a simplified diagrammatic showing an array detector system used in the FIG. 1 illustrated optical disk device.

FIG. 2 illustrates, in accordance with the present invention, basic operations of array detector 63 receiving detectable beam 110 from ring lens 62. As indicated by numeral 12, ideally, ring lens 62 has no central aperture. At the current time, due to manufacturing limitations, a small central aperture (not shown) in ring lens 62 is required. This central aperture in the lens torus 62-T (FIG. 1) should be minimized. Detectable beam 110 impinges on array detector 63 having an outer diameter circle 111 and inner diameter circle 113 resulting in light annulus 111–113. The inner circular portion 114 has a reduced light intensity with respect to the light intensity in the light annulus 111–113. Array detector 63 has a receptor array 123 of a multiplicity of rectangularly-arranged individual photo receptors 115, each photo receptor being an individual photo detector. While FIG. 2 shows a few photo receptors 115 within the detectable beam 110 cross section, it is to be understood that many receptors 115 are in array detector 63. For example, detectable beam 110 outer diameter circle 111 may have a measurement of about three millimeters (mm) while each receptor is a square having sides of about 50–100 microns. In an early embodiment, array detector 63 had an extent twice outer diameter circle 112—six mm. Because the size of each photo receptor 115 is at least an order of magnitude smaller than the detectable beam 110, the number of photo receptors within is large.

AP 100 scanning receptor array 123 via switch array 124 (FIG. 3) detects which of the photo receptors 115 are and are not receiving predetermined light intensities. Such scanning detection defines light annulus 111–113. AP 100 receives electrical signals (herein termed array signals) from array detector 63 for generating the error signals FES and TES on lines 102 and 103. The focus error signal is determined in AP 100 by equation (1):

$$FES=(I-O)/(I+O) \tag{1}$$

wherein FES is the focus error signal, I is inside circle 113 diameter and O is outer circle 111 diameter. Reference I and O values are generated either during the manufacturing process or during a later-described automatic re-calibration of array detector 63.

Figure 4:
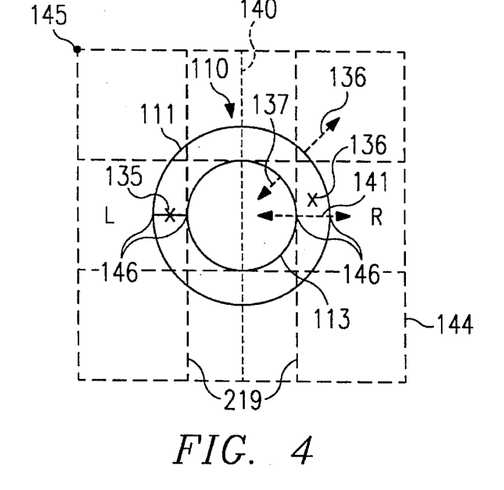
FIG. 4 illustrates principles and operation of the present invention for laser beam-image alignment in an array detector plus generation of control/error signals using an array detector.
Figure 5:
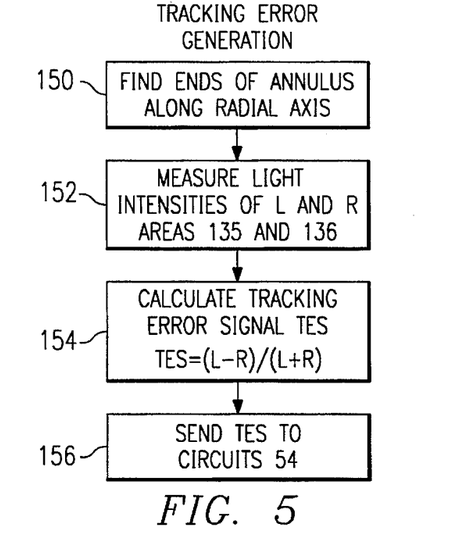
FIGS. 5 and 6 are simplified machine operation charts of machine operations for generating control/error signals in the FIGS. 1 and 2 illustrated optical device and array detector system.

AP 100 generates a tracking error signal TES using equation (2):

$$TES=(L-R)/L+R) \tag{2}$$

wherein L is the left side (FIG. 4) light intensity of light annulus 111–113, as later described, in area 135, as shown in FIG. 4 and later described. R is the right side light intensity of light annulus 111–113 in area 136. Areas 135 and 136 are radially aligned with respect to disk 30. Track following errors in opposite radial directions of disk 30 result in respective decreased light or darkened areas at 135 and 136, thereby indicating the radial direction of the track following error. This uniaxial light-intensity distortion pattern is symmetrical about vertical line 140. Line 140 is substantially aligned with (tangential to) the center line of any track being scanned. Axis 140 need not be precisely aligned with the columns of photo receptors 115.

Figure 3:
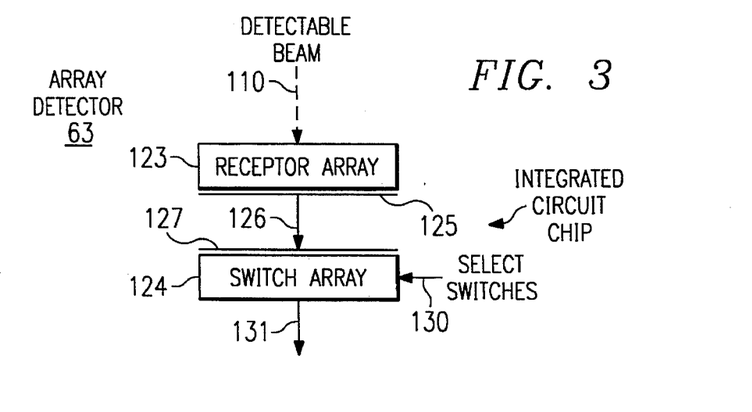
FIG. 3 shows an array detector integrated-circuit construction usable in the FIGS. 1 and 2 illustrated device and array detector system.

FIG. 3 diagrammatically illustrates an array detector 63. Receptor array 123, consisting of photo receptors (each receptor is an individual photo detector) 115 (FIG. 2) is connected internally to an integrated circuit chip, comprising array detector 63, to electronic switch array 124. Each photo receptor 115 has a separate output connection (not shown) within the integrated circuit chip for carrying an electrical signal indicating light intensity impinging thereon. Therefore, array detector 63 having 1000×1000 receptor array has a connected 1000×1000 semiconductor switch array 124, each of photo receptors being connected to a respective one of the integrated circuit electronic switches (not shown) in switch array 124. Line 125 represents 1000× 1000 connections to the respective photo receptors, cable 126 represents integrated circuit internal connections to respective switches of switch array 124, such connection being represented by line 127. Each of the integrated electronic switches in switch array 124 has a control input. Select switches cable 130 carries electrical signals that select the switches one at a time for sequentially supplying array signals over cable 131 to AP 100. In a constructed embodiment, the integrated circuit switches (not separately shown) in switch array 124 are sequentially activated producing a scan along columns and rows of receptor array 123.

FIG. 4 diagrammatically illustrates an impinging detectable beam 110 light pattern on array detector 63 with diverse measurement points. First, focus errors are detected by radial changes of light intensities in detectable beam 110. An out-of-focus condition is indicated either by a radially outwardly movement, indicated by arrow 136, of outer diameter circle 111 from a best focus condition on receptor array 123 or inner circle 113 moving radially inwardly, indicated by arrow 137 on receptor array 123. Arrows 136 and 137 respectively indicate focus errors as described above. The focus error magnitude and direction are calculated using equation (1). Second, tracking errors are indicated by reduced light intensity (darkening) in either area 135 or 136 of light annulus 111–113 from a constant light intensity, i.e. to indicate a track following error, a darkened or reduced-light area appears either in area 135 or 136. Accordingly, TES is generated by comparing the relative light intensities along horizontal axis indicated by double-headed arrow 141. Area 135, on side L of the light annulus, represents reduced light intensity caused by a first radial movement of laser beam from center of a track being followed or scanned. A track following error on disk 30 in an opposite radial direction results in a darkened area on side R in area 136. Equation (2) defines calculation of TES based on measuring L and R respective light intensities. Central vertical diameter line 140 represents an alignment of light annulus 111–113 with respect to track center-line (not shown) on disk 30, as is well known in astigmatic track following systems. If array detector 63 is unintentionly moved transversely with respect to line 140, an unwanted track following offset error occurs. Automatic recalibration of the light impingement on array detector 63 without physically adjusting array detector 63 removes this unwanted offset error. Only one darkened area occurs at a time.

Calibration of detectable beam 110 impingement on array detector includes two automatically-executed steps. A later-described first step 180 (FIG. 8) is to find a best focus condition. Note that moving array detector ever so slightly along the path of detectable beam 110 results in focus error offsets. The best focus for a current position of array detector 63 is to be maintained. Such best focus is determined by generating a light annulus having a minimal radial extent. This minimum radial extent only occurs with truly collimated light (in focus condition) passes through ring lens 62. A later-described second step 181 (FIG. 8) determines a correct "on-track" indicating position of the detectable beam 110 impingement on array detector 63. This determination is preferably achieved by first focusing the laser beam to a best focus condition using a mirror area 30-M (FIG. 1) of disk 30, i.e. an area having no track-indicating groove. Disk 30 has two such mirror areas 30-M, one at an inner and one at an outer diameter. With no groove to distort the detectable beam, scanning the array detector 63 received light from a mirror area 30-M readily obtains an on-track indication for the read beam.

While all of the photo receptors (individual photo detectors) 115 may be scanned for each focus error signal and tracking error signal generation, less than all of the receptors may be scanned. Dashed line box 144 represents a rectangular array of receptors 115 that is less than all of the array detector 63 receptors. If the outer diameter of annulus 111–113 is about 3 mm., then each side of square 144 should be at least 6 mm., twice the outer diameter of annulus 111–113. This scannable sub-array 144 is anchored or identified by one receptor 115 at point 145 at its the upper left hand. The row and column address of the anchor receptor are address offsets for the relative addresses of the receptors in scannable sub-array or box 144 enabling base plus offset addressing to effect the scanning.

Referring next to FIG. 5, tracking error signal (TES) generation is described. AP 100 implements the FIG. 5 illustrated machine operations. Before beginning the description of the method, some mounting tolerances are discussed. According to the invention, such mounting tolerances do not adversely affect accuracy in generating track following errors. The automatic in situ calibration of the detectable beam 110 impingement on receptor array 123 automatically accommodates array detector 63 diverse positions, as well as rotational positions indicated in FIG. 4 by double-headed arc arrow 149. Since array detector 63 is not physically aligned as in the prior art with the surface of disk 30, array detector 63 may be skewed (rotated) with respect to the disk 30 recording surface. That is, axis 141 may not be on a true radius of disk 30. Since the receptors 115 are very small with respect to the size of light annulus 111–113, this unintended skewing can be ignored. The circular symmetry of light annulus 111–113 also accommodates the rotationally skewed positions. The later-described automatic focus calibration accommodates diverse array detector 63 positions axially of the reflected laser beam. Finally, the later-described track following calibration accommodates lateral vertical and horizontal positions of array detector 63. The larger the receptor array 123 and the smaller the receptors 115, the greater the accommodated lateral tolerances.

Steps 150 and 152 can be performed in either one of several ways. A first method, wherein steps 150 and 152 are simultaneously performed, is to scan a predetermined number, preferably greater than one, of rows of receptors 115 along double-headed arrow 141. During the scan, AP 100 senses and stores the light intensity values of all of the scanned receptors. Then AP 100 totals the sensed light intensities to generate two total intensity values respectively for areas 135 and 136. The two total values indicate any tracking following errors. Step 154 calculates a digital value TES using equation (2). Step 156 converts the digital value TES to an analog TES for sending the analog TES to circuits 54, as will become apparent.

While one row of receptors may be used for generating TES, sensing a small plurality of rows provides greater reliability. For example, some receptors 115 may vary in responsiveness to light. Sensing a plurality of rows tends to reduce the probability of error. The scanned photo receptors in each column position of the scanned rows may be averaged to obtain an average light intensity value for each column position of the scanned rows. Intensity summing is performed in AP 100 using usual programming techniques. Intensity averaging may also be employed rather than summing the individual receptor 115 indicated light intensities. Such intensity averaging may be of all scanned receptors respectively sensing light in areas 135 and 136. It is preferred that averaging be conducted on a column-by-column basis. That is, if ten rows of receptors 115 are being scanned, then ten photo receptors from each column of photo receptors are scanned. The indicated light intensities of each of photo receptors in the respective columns are averaged. Then, the column averaged values are respectively totaled to create a light intensity value for each area 135 and 136.

This first method does not store individual values of the scanned receptor indicated light intensities in AP 100. For purposes of illustration, a second method stores a replica of the scanned receptors 115 indicated light intensities. Step 150 determines the radial edges 146 defining radial sections L and R of light annulus 111–113 as the receptor rows to be scanned. Then the receptor rows are scanned for sensing and storing respective indications of the receptor light intensities in the identified portions 135 and 136 of light annulus 111–113. Step 152 totals the sensed and indicated intensities generating two intensity values respectively for areas 135 and 136. Step 154 solves equation (2) to generate a digital value TES. Step 156 generates an analog TES from the equation (2) generated digital value TES.

In another method, the entire rows of receptors 115 lying along double-headed arrow 141 are scanned. The sensed and indicated individual light intensity values are stored in AP 100. Step 150 examines the stored values for finding the L and R light intensities of the detectable beam 110 impingement. Step 152 sums the AP 100 stored values of the sensed receptors respectively located in areas 135 and 136 of the light annulus. Step 154 solves equation (2) for generating a digital value TES, the tracking error signal. Step 156 converts the digital value TES to generate an analog TES and to send the analog TES to focus and tracking circuits 54. From the above description, it is seen that numerous methods may be used to generate TES, a specific method of TES generation is one of design choice.

Figure 6:
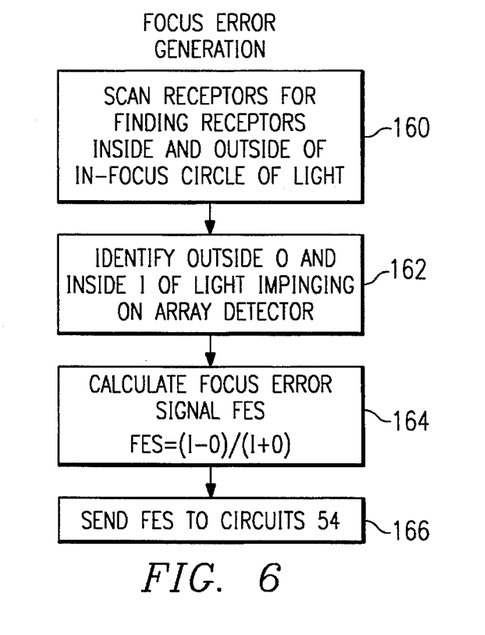

Similarly to FIG. 5, FIG. 6 illustrates generation of focus error signal FES based on the array detector 63 sensed signals. It is assumed that the receptor 115 sensed light values are stored in AP 100. Step 160 scans the detectable beam 110 impingement on array detector 63 and stores the scanned beam impingement image in AP 100. AP 100 in step 162 scans stored sensed receptor 115 values in any orientation for finding an inside location I of annulus 111–113 as may be moved radially inward on receptor array 123 by a first defocus indicated by arrow 137 (FIG. 4) and an outside location O that may have been moved radially outward on receptor array 123 by a second defocus condition indicated by arrow 136. Light annulus 111–113 is subjected to but one of the defocus conditions at any one instance. The identification of I and O is like the identification of L and R but at a different circumferential position to avoid any annulus 111–113 perturbations caused by tracking errors. For example, a plurality of radii vectors may be scanned and averaged for obtaining a digital focus error signal. In another approach, receptors 115 in a plurality of columns disposed along the vertical axis 140 (FIG. 4) may be used for generating FES. In yet another approach, all radii vectors are used to generate FES. In still another approach, the tracking error direction L or R is determined. Yet other geometric approaches to measuring and indicating a focus error signal may be used.

Once I and O values are determined, step 164 solves equation (1) to generated a digital value of FES. Step 166 converts the digital FES to an analog FES, then transmits the analog FES over line 102 to focus and tracking circuits 54. From the above description it is seen that diverse geometric methods may be used to measure and indicate FES based on the present inventive focus error detection and indication methodology.

Figure 7:
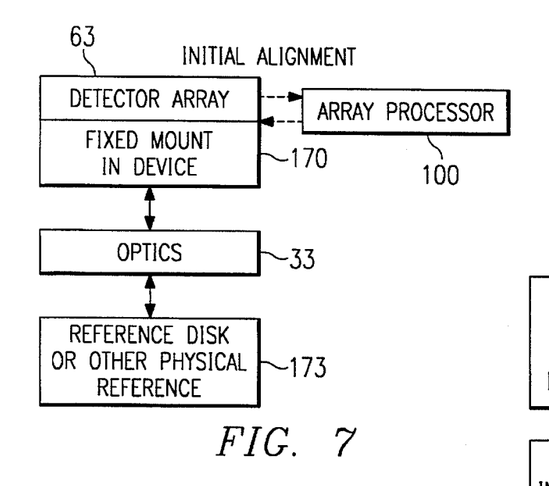
FIG. 7 diagrammatically illustrates an array detector alignment apparatus usable for initially aligning and calibrating the FIG. 1 illustrated device.
Figures 8, 10:
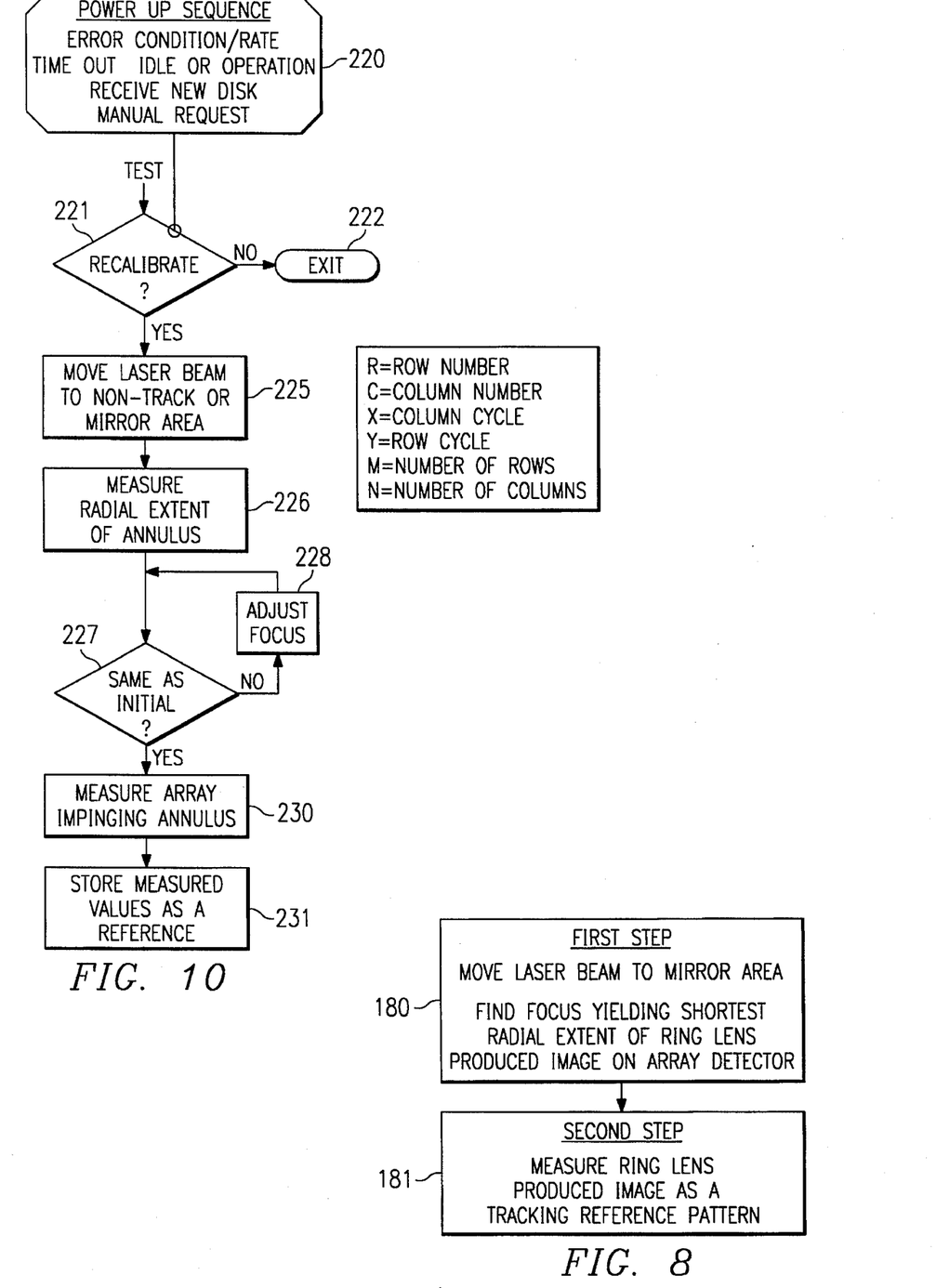
FIG. 8 is a simplified machine operation chart showing automatic alignment and calibration of a detectable beam impinging on an array detector in the FIG. 7 illustrated apparatus.
FIG. 10 is a simplified machine operation showing an initially calibration the FIG. 2 illustrated optical system.
Figure 9:
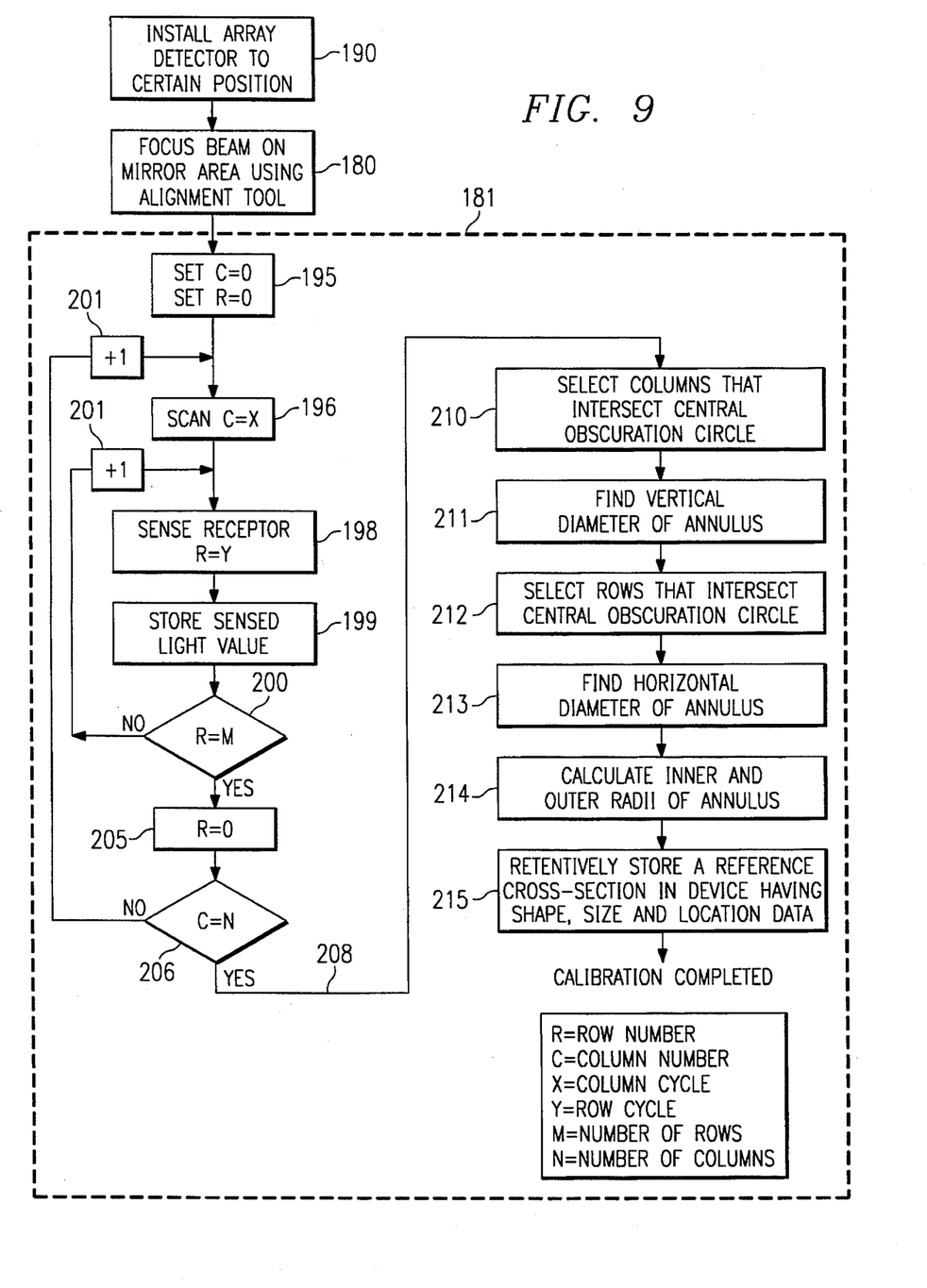
FIG. 9 is a simplified machine operation chart showing automatic re-calibration of an image impinging on the optical system shown in FIGS. 1 and 2.

FIG. 7 diagrammatically illustrates one arrangement for initially calibrating impingement of detectable beam 110 to a current position of array detector 63. This illustrated initial calibration can be achieved, in situ, before the FIG. 1 illustrated device is fully assembled. That is, carriage 34 as supported on frame 35 without any optical disk receiver is used for initial calibration. Rather than a usual adjustable or movable mount for mounting array detector 63, a lower-cost fixed mount 170 is included in the described-above subassembly. Array detector 63 is simply mounted in the fixed mount without calibration of the array detector 63 to disk 30 as previously required. In any event, an initial physical location for array detector 63 is provided to tolerances than are less stringent than those used in positioning an astigmatic focus and error detector in an optical device. A smooth-surface reference disk 173 or other physical reference simulating an optical disk is positioned with respect to optics 33 for enabling a fully automatic initial calibration. The subassembly is then activated for causing laser 67 to emit a usual laser beam to be used in initial calibration, such as a laser read beam. Reference disk 173 reflects the laser beam back to optics 33 for impinging on array detector 63 for automatically calibrating the impingement of detectable beam 110 on array detector 63. AP 100 then proceeds to an initial calibration procedure as shown in FIG. 9. In a second initial calibration procedure (not shown), initial calibration is effected in a fully-assembled device (FIG. 1) as shown in FIG. 10 for recalibration. This initial calibration accommodates all array detector 63 lateral positions, axial positions and rotational positions within a broad range of physical tolerances not previously envisioned for optical detectors.

Referring next to FIG. 8, the simplified machine operation chart illustrates the above-mentioned first and second calibration steps. Step 180, in FIG. 1 illustrated completed device, moves laser 67 beam to a mirror area. Reference disk 173 and the above-described sub-assembly are moved into alignment. Laser 67 is activated to emit a laser beam. AP 100 is repeatedly activated to measure focus error. Focus and tracking circuits 54 respond to the repeated focus error measurements to minimize the radial dimension of annulus 111–113 that indicates a best focus condition. Second step 181 measures the ring lens 62 produced detectable beam 110 impingement on array detector for creating a stored reference image in AT 110 for focus and tracking error detection and indication. The stored reference image is used for detecting and indicating focus and tracking errors.

FIG. 9 is a detailed showing of an initial calibration using the first and second steps 180 and 181. The FIG. 9 illustrated initial calibration includes mathematically determining and defining light annulus 111–113. The receptors 115 that will receive light from an on-track in-focus detectable beam 110 are identified using rectangular array addresses. Step 190 installs array detector 63 on fixed mount 170 in a calibrating position (FIG. 7). First step 180 finds best focus. Next-described receptor-array 123 scanning steps 195 through 206 of second step 181 are also executed in first step 180 for determining the impingement of detectable beam 110 on array detector 63. An identical set of steps are executed in step 180 for each measurement of focus, i.e. the entire receptor 115 array is scanned for each repeated focus measurement until a best focus is detected as detailed in FIG. 10. Turning now to the receptor-array scanning steps, step 195 initializes the scan by setting column number count C to zero and row number count R to zero. Steps 196–201 effect scanning of receptors 115 in each column. Step 196 begins scanning column X, first column scanned is column zero (0). Step 198 senses receptor Y of column X. The first row in each column scan is always row zero (0). Step 199 stores the sensed receptor received light into AP 100. Step 200 determines if the last receptor 115 to be sensed in column X has been just sensed. If Y is less than M (M is the number of rows, i.e. one greater than the maximum row number), then column X continues to be scanned. Step 201 increments the row number to Y+1. The column sensing loop repeats until Y=M. Then steps 205–206 are executed for selecting a next column of receptors 115 to be scanned. Step 205 resets the row count R to zero. Step 206 compares current column count C with N, the number of columns. If C is less than N, then step 207 increments the column count C by unity. Steps 196 through 207 then repeat. If C=N, then machine operations proceed over path 208 to steps 210–215 for measuring the best focus impingement pattern on receptor array 123.

Next described, with reference to FIG. 9, is mathematically defining a reference detectable beam 110 impingement on array detector 63. Such defined reference detectable-beam impingement is largely independent of the physical mounting of the array detector 63. Step 210 selects those receptor 115 columns that intersect the inner diameter or central obscuration circle 113 represented by vertical lines 219 (FIG. 4). It is desired that the column intersection of inner diameter circle 113 require 10% decreased light areas (gap in light intensity) in each column measured between the outer diameter circle 111. That is, if there are 100 receptors in one column of receptors that disposed within outer diameter circle 111, then at least ten of such receptors in the one column must be within inner diameter circle 113 with a predetermined reduced irradiance level. The columns intersecting inner diameter circle 113 are identified in AP 100. Step 211 counts the number of receptors in a column aligned with vertical line 140 for finding the vertical diameter of annulus or outer and inner diameter circles 111 and 113. Step 212 selects those rows of receptors meeting the above-stated circle 113 intersection requirements. Step 213, then counts the number of receptors lying along double headed arrow 141 to find the horizontal diameters of outer and inner circles 111 and 113. AP 100, in step 214, then calculates the radii of outer and inner diameter circles 111 and 113. The center of annulus 111–113 is determined by finding the intersections of line 140 and double-headed arrow 141 within outer diameter circle 111. The rectangular coordinates of the receptors 115 within the just-defined reference annulus 111–113 is calculated using the equations set forth below:

Column location $X = r \cos \Theta + xc$  (3)

Row location $Y = r \sin \Theta + yc$  (4)

where X and Y are column and row locations, r is radius, $\Theta$ is an angle from the x axis (double-headed arrow 141 of FIG. 4) and xc and yc are the two coordinates of the annulus center, Both the mathematically defined and addresses for the receptors associated with the reference annulus or light impingement on array detector 63 are stored in AP 100. Using these reference values, focus error and tracking error signals are generated as above described. The mathematical definition of a reference annulus provides smooth circles 111 and 113.

FIG. 10 illustrates re-calibrating the desired impingement of detectable beam 110 for obtaining best focus and track centering. Re-calibration is initiated by any one or more of several criteria 220. Such re-calibration can be initiated during each power up sequence for the subsystem (not shown) into which the FIG. 1 illustrated device is a portion. A second condition initiates re-calibration upon detecting and indicating predetermined error conditions or error rates. Such error conditions and rates can be data reading error conditions and rates, excessive tracking errors, diagnostically detected error conditions and the like. Time of usage may also be a basis using a time out timer that measures accumulated usage time or usage plus idle times of operations. Each time a new disk is inserted into the FIG. 1 illustrated device may also be used to trigger re-calibration. Lastly, a manual request may be used. A combination of selected ones of the above identified criteria may also be used.

In AP 100, step 221 is entered from any dispatcher or other program sequencer. If appropriate criteria 220 are not present, then no re-calibration is performed. Exit is taken over path 222 to other machine operations. Responding to a re-calibrate need, AP 100 at step 225 moves the laser beam 47 to a known mirror (non-grooved or non-track) portion 30-M of disk 30 (FIG. 1). Then, steps 226–228 obtain best focus as set forth for step 180 (FIG. 8). These steps minimize the radial extent of annulus 111–113. Step 226 measures the radial extent of the annulus 111–113, as previously described. Steps 227 and 228 are a loop for adjusting focus until step 227 finds no change in the focus level, i.e. the radial extent does not decrease from a previous detected radial extent. The first pass through step 227 always results in using the step 227 NO exit. After finding best focus, second step 181 is performed by steps 230 and 231. Step 230 is shown by steps 195–214 of FIG. 9. Step 231 is shown by step 215 of FIG. 9.

Rather than mathematically defining annulus 111–113, an image of all of the receptors yielding light in a calibration or re-calibration of the detectable beam 110 impingement can be stored in as a memory array. For obtaining smooth circles 111 and 113, it is preferred to use the mathematical definition of a reference array. Such mathematical definition can be stored as a table of receptor addresses using known programming techniques. Alternately, the sensed and measured reference impingement image replica may be stored in AP 100. Since there may be minor distortions in a sensed reference image, edge smoothing techniques may be required for optimum operation of the optical device.

Figure 11:
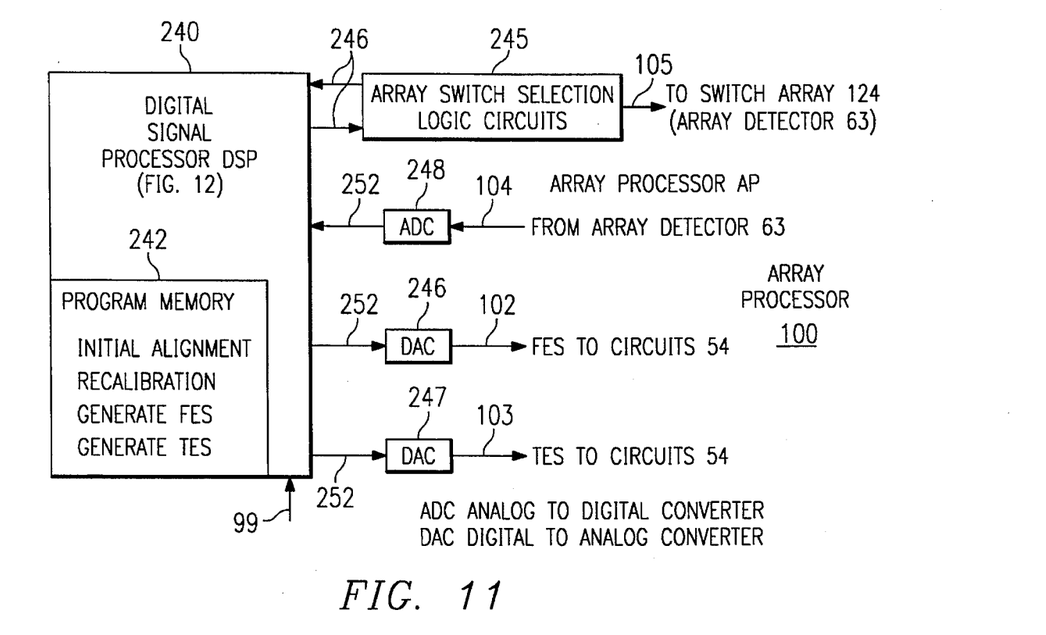
FIG. 11 is a simplified block diagram of an array processor used in the FIGS. 1 and 2 illustrated device and optical system.

FIG. 11 is a simplified block diagram of AP 100. The heart of AP 100 is digital signal processor DSP 240. DSP 240 was model TMS320C5x DSP manufactured and sold by Texas Instruments Co. Dallas, Tex. DSP 240, detailed in FIG. 12, includes program memory 242. Program memory 242 includes executable programs for effective initial alignment, re-calibration, generate FES and generate TES. The structure of these programs are represented by the machine operations charts and other description for enabling one of ordinary skill in the art to design and construct such programs for practicing the present invention. DSP 240 receives instructions and commands over line 99 from device controlling microprocessor 40. Switch array 124 (FIG. 3) selection logic circuits 245 connect DSP 240 to switch array 124 connected to array detector 63. Selection circuits are usual address translation circuits used for addressing rectangular arrays of elements, such as receptors 115. Digital to analog converters (DACs) 246 and 247 respectively connect DSP 240 to lines 102 and 103. DACs 246 and 247 convert digital representations of FES and TES to analog FES and TES, respectively. Analogue to digital convertor 248 converts the analog signal outputs of selected receptors 115 to digital form for processing in DSP 240.

Figure 12:
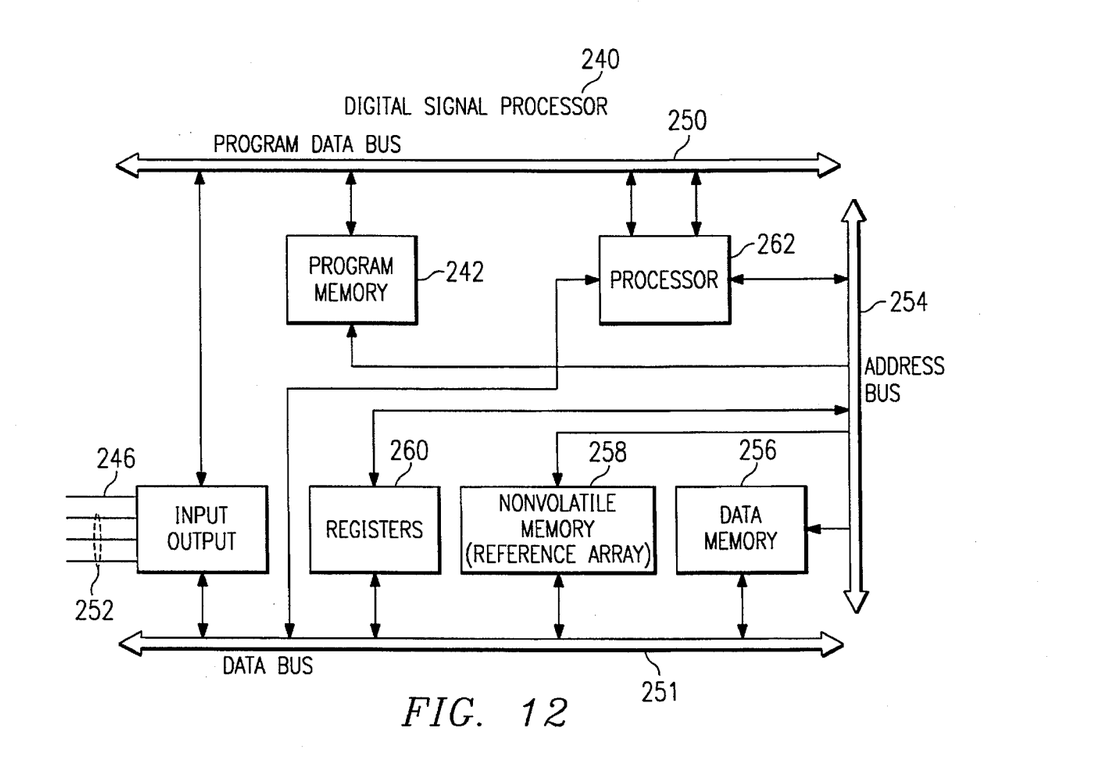
FIG. 12 illustrates, in simplified form, a digital signal processor usable in the FIG. 11 illustrated array processor.

FIG. 12 is a simplified presentation of DSP 240. Program data bus 250, data bus 251 and address bus 254 connect the elements of DSP 240 together. Volatile data memory 256 provides for operand data storage. Non-volatile memory 258 stores the reference array for practicing the present invention. Registers 260 provide temporary data storage. Processor 262 provides usual processor circuits, such as an arithmetic logic unit (ALU), scalers, auxiliary computations and the like. Input output 264 provides external connections to array switch selection logic circuits 245 and over lines 252 to convertors 246–248. Usual DSP programming techniques are used to program control the above-described machine operations.

While the circularly symmetrical arrangement is preferred, the present invention may be practiced with non-circularly symmetrical elements that selectively optical refract light, such as with Fresnel plates disposed in a spaced-apart relation along line 140, for example. Other optical light-refracting elements responsive to collimated light as a reference light to not refract light but refract light that is not collimated may be used.

While the invention has been particularly shown and described with reference to preferred embodiments thereof, it will be understood by those skilled in the art that various changes in form and details may be made therein without departing from the spirit and scope of the invention.

What is claimed is:

1. A method of operating an optical device having a work surface means, a laser supplying a laser read beam to said work surface means to be reflected as a reflected light beam by said work surface means to a read portion of an optical system in said optical device as a somewhat circular cross-sectioned light beam;

comprising steps of:

receiving said reflected light beam in said read portion for converting said reflected light beam from said somewhat circular cross-sectioned light beam to a predetermined symmetrical cross-sectioned beam having a predetermined cross-sectional received shape and received size different from said somewhat circular cross-sectional shape and size as a detectable light beam;

providing an array detector having a cross-sectional extent greater than said cross-sectional size of said detectable light beam and having a multiplicity of photo receptors, each said photo receptor having an extent less than said cross-section of said detectable light beam;

establishing a reference array of reference light signal indications having a desired array shape, desired size and desired lateral location on said array detector within said greater cross-sectional extent;

directing said detectable light beam to impinge on said array detector at a received lateral location;

separately detecting in said receptors respective predetermined portions of said detectable light beam for generating first electrical array signals representative of said impinging detectable light beam;

in said separately detecting step, detecting ambient light in said array detector in predetermined ones of said photo receptors not impinged by said detectable light beam for generating second electrical array signals representative of said ambient light; and comparing said indicated reference array with said first and second array signals for generating a difference set of said array signals for indicating predetermined differences between said indicated desired array shape, desired size and desired lateral location with said first and second array signals indicated received shape, size and lateral location of said longitudinal light beam for indicating a predetermined error condition in said optical device and having a predetermined error magnitude.

2. The method set forth in claim 1, including a step responding to said indicated predetermined error condition for changing a predetermined operation of said optical device for reducing said predetermined error magnitude; and responding to said changing said predetermined operation for changing said cross-sectional shape, size and lateral location of said predetermined array of light elements to be closer to said desired array shape, size and lateral location.

3. The method set forth in claim 1, including steps of:

automatically focussing said read beam on said work surface means wherein said automatically focussing is subject to a focussing error;

in said receiving step, converting said reflected light beam to exhibit circular symmetry and having a received light annulus of increased light intensity with respect to predetermined portions of said detectable light beam outside said light annulus;

in said establishing step, establishing a reference light annulus having a reference radial extent;

in said comparing step, detecting that said received light annulus has a received radial extent different from said reference radial extent for indicating said focussing error.

4. The method set forth in claim 1, including steps of:

providing a rotatable optical disk having a spiral groove indicating a data track as said work surface means;

scanning said laser read beam centered along said data track as a track-following device operation subject to tracking errors at which said scanning does not center said laser read beam on said data track;

in said receiving step, converting said reflected light beam to exhibit circular symmetry and having a received light annulus of increased light intensity with respect to predetermined portions of said detectable light beam outside said light annulus;

in said establishing step, establishing a reference light annulus having a reference substantially circular shape;

in said comparing step, detecting that said received light annulus has a received non-circular shape for indicating said tracking error.

5. The method set forth in claim 1, including steps:

including in said work surface means a mirror area;

in said receiving step while receiving said reflected light beam from said mirror area, converting said reflected light beam to exhibit circular symmetry and having a calibrating light annulus of increased light intensity with respect to predetermined portions of said detectable light beam outside said light annulus such that said calibrating light annulus has a radial extent indicative of focus condition;

in said establishing step:

in a first step within said establishing step finding a best focus condition of said laser read beam and establishing a reference light annulus having a reference radial extent, said first step including;

automatically focussing said read beam on said mirror area wherein said automatically focussing is subject to a focussing error;

repeatedly measuring said radial extent of said calibrating light annulus for finding a minimum one of said radial extent measurements;

selecting said minimum one of said radial extent measurements for indicating said best focus condition and making said minimum one of said radial extent measurements as a reference radial extent;

after said first step, in a second step within said establishing step finding a lateral location and shape of said calibrating light annulus for generating said reference light annulus, said second step including:

maintaining said focus at said best focus condition;

scanning said array detector photo receptors for generating reference ones of said array signals, said;

identifying all of said photo receptors receiving and detecting said impinging detectable light beam;

analyzing said identified photo receptors for indicating a shape and location of said received reference detectable light beam; and selecting said indicated shape and location of said reference detectable light beam as said reference array of light signals.

6. The method set forth in claim 5 wherein a central obscuration circle is within said calibrating light annulus: including steps:

in said identifying step, identifying intersecting rows and columns of said photo receptors for generating a rectangular array of said array signals;

in said analyzing step:

first finding and indicating columns of said array signals that include ones of said array signals in said central obscuration circle;

second finding a central one of said columns having a longest portion in said central obscuration circle of any of said found and indicated columns for indicating a vertical axis of said calibrating light annulus;

third measuring the length of said central one of said columns for indicating a vertical outer diameter of said calibrating light annulus and diameter of said central obscuration circle;

fourth finding and indicating rows of said array signals that include ones of said array signal in said central obscuration circle;

fifth finding a central one of said rows having a longest portion in said central obscuration circle of any of said found and indicated rows for indicating a horizontal axis of said calibrating light annulus;

sixth measuring the length of said central one of said rows for indicating a horizontal outer diameter of said calibrating light annulus and diameter of said central obscuration circle;

seventh combining said measured lengths for calculating radii of said calibrating light annulus;

retentively storing in said optical device as said reference annulus said calculated and measured lengths and radii and respective locations of said identified photo receptors.

7. The method set forth in claim 1, including steps:

in said establishing step, establishing a rectangular array of said photo receptors than is greater than said desired size and smaller than said cross-sectional extent of said array detector and centering said established array on said reference array desired lateral location; and in said separately detecting step, detecting only those photo receptors in said established rectangular array.

8. The method set forth in claim 1, including steps:

providing a rotatable optical disk having a spiral groove indicating a data track as said work surface means;

scanning said laser read beam centered along said data track as a track-following device operation subject to tracking errors at which said scanning does not center said laser read beam on said data track;

in said receiving step, converting said reflected light beam to exhibit circular symmetry and having a received light annulus of increased light intensity with respect to predetermined portions of said detectable light beam outside said light annulus;

in said establishing step, establishing a reference light annulus having a substantially circular reference shape;

defining a vertical axis of said reference shape aligned with a tangent to said data track;

in said comparing step, detecting and indicating that said received light annulus has a received annulus distorted inwardly along an axis transverse to said defined vertical axis at only one side of said received annulus; and responding to said indicated inward distortion for indicating said tracking error occurring in a predetermined radial direction of said data track.

9. The method set forth in claim 1, including steps:

providing a rotatable optical disk having a spiral groove indicating a data track as said work surface means;

scanning said laser read beam centered along said data track as a track-following device operation;

during said scanning, automatically focussing said read beam on said data track wherein said automatically focussing is subject to a focussing error;

in said receiving step, converting said reflected light beam to exhibit circular symmetry and having a received light annulus of increased light intensity with respect to predetermined portions of said detectable light beam outside said light annulus;

in said establishing step, establishing a reference light annulus having a reference radial extent and said reference location;

in said comparing step, detecting and indicating that said received light annulus has a received radial extent different from said reference radial extent because of a change in size from said reference size in a predetermined one of two radial directions; and responding to said indication of change in radial extent for indicating a focus error in a predetermined one of two out-of-focus positions of too-close or too-far from said data track.

10. The method set forth in claim 1, including steps:

providing a rotatable optical disk having a spiral groove indicating a data track and a mirror area radially adjacent said spiral groove as said work surface means;

scanning said laser read beam centered along said data track as a track-following device operation;

in said receiving step, converting said reflected light beam to exhibit circular symmetry and having a received light annulus of increased light intensity with respect to predetermined portions of said detectable light beam outside said light annulus;

in said establishing step, establishing a reference light annulus;

indicating a predetermined criterion that said detectable beam should be recalibrated to said array detector;

responding to said criterion indicating step for recalibrating said detectable beam to said array detector in first and second steps;

in said first step within said recalibrating step finding a best focus condition of said laser read beam and establishing a reference light annulus having a reference radial extent, said first step including;

moving said laser read beam to said mirror area;

automatically focussing said read beam on said mirror area wherein said automatically focussing is subject to a focussing error;

repeatedly measuring said radial extent of said calibrating light annulus for finding a minimum one of said radial extent measurements;

selecting said minimum one of said radial extent measurements for indicating said best focus condition and making said minimum one of said radial extent measurements as a reference radial extent;

after said first step, in a second step within said recalibrating step finding a lateral location and shape of said calibrating light annulus for generating said reference light annuls, said second step including:

maintaining said focus at said best focus condition;

scanning said array detector photo receptors for generating reference ones of said array signals, said;

identifying all of said photo receptors receiving and detecting said impinging detectable light beam;

analyzing said identified photo receptors for indicating a shape and location of said received reference detectable light beam;

selecting said indicated shape and location of said reference detectable light beam as said reference array of light signals; and returning said laser read beam to said data track.

11. The method set forth in claim 10, including steps:

selecting said cross-sectional extent of said receptor array to be at least twice said cross-sectional size of said detectable light beam; and selecting said photo receptors to each have a light-receiving extent that is at least an order of magnitude smaller than said cross-sectional size of said detectable light beam.

12. An optical device having a laser for emitting a read beam to a work surface means, said work surface means reflecting said read beam as a reflected beam, said reflected beam having a somewhat circular cross-section, an optical read system in said optical device for receiving said reflected beam, said work surface means modulating said read beam for indicating predetermined spatial relationships between said read beam and said work surface means:

an improvement, including, in combination:

a beam cross-sectional shape converter in said optical read system for receiving and converting said reflected light beam from said somewhat circular cross-sectional shape to a detectable light beam having a predetermined cross-sectional shape with a predetermined lateral symmetry that is substantially different from said somewhat circular cross-sectional shape, said detectable beam having a predetermined cross-sectional size and lateral position;

an array detector having a multiplicity of light receptors disposed in a predetermined array, said predetermined array having a predetermined extent lateral to said detectable beam that is substantially greater than said cross-sectional size of said detectable beam, each of said light receptors having an extent lateral to said detectable beam that is substantially less than said cross-sectional area of said detectable beam;

said array detector being disposed with respect to said beam converter for receiving said detectable beam;

a switch array having electronic switches respectively connected to said light receptors for receiving signals from said light receptors indicating whether the respective light receptors received light from said detectable beam or no light from said detectable beam and respectively supplying array signals for indicating that the light receptors received said detectable beam did or did not receive said detectable beam;

reference means having an indication of an array of reference signals for indicating a desired cross-sectional shape, size and lateral location in said predetermined extent for indicating a predetermined error-free condition;

array comparison means connected to said reference means and to said switch array for receiving said reference signals and said array signals for comparison for indicating a predetermined difference in shape, size and lateral location, in said predetermined extent between said reference array and said predetermined array; and control means in said optical device connected to said array comparison means for responding to said predetermined difference for changing a predetermined operation of said optical device for reducing a size of said predetermined difference whereby a predetermined desired operation of the optical device is maintained.

13. The device set forth in claim 12, including, in combination:

a digital signal processor connected to said switch array;

said switch array and said array detector being disposed within an integrated circuit chip;

said reference means being a memory means in said digital signal processor;

said array comparison means being a program in said digital signal processor executable by said digital signal processor; and said digital signal processor having scanning means for sequentially selecting predetermined ones of said switches for scanning output of said light receptors, respectively.

14. The device set forth in claim 12, including, in combination:

said array detector and said switch array being in one integrated circuit chip; and all connections of between said receptors and said switch array being in said integrated circuit chip.

15. The device set forth in claim 12, including, in combination:

said predetermined array lateral extent being at least twice said cross-sectional size of said detectable beam; and each of said light receptors having a light receiving surface with an extent an order of magnitude less than said cross-section size of said detectable beam.

16. The device set forth in claim 12, including in combination:

said beam cross-sectional shape convertor being a ring lens for converting said reflected light beam into said predetermined cross-section as a circularly symmetrical cross-section.

17. The device set forth in claim 16, including in combination:

said work surface means being a rotatable optical disk having a spiral groove indicating a data track;

means connected to said rotatable optical disk and to said laser for scanning said read beam along said data track indicated by said groove;

said groove modulating said reflected light beam for indicating a tracking error of the laser beam following said data track in an off-center radial position with respect to said data track;

said optical disk reflecting said laser beam for modulating said reflected light beam an indication of a current focus condition;

said array comparison means having focus detecting means and tracking error detecting means for respectively detecting and indicating for detecting said modulations and indicating focus and tracking errors.

18. The device set forth in claim 12, including, in combination:

said array comparison means having limiting means indicating a limited rectangular array of first ones of said switches respectively connected to ones of said photo receptors in a sub-array larger than said desired size and smaller than said cross-sectional extent of said array detector and centered about said reference array desired lateral location; and scanning means in said array comparison means and connected to said limiting means for scanning only said first ones of said switches for detecting only those photo receptors in said established rectangular array.

19. The device set forth in claim 12, including, in combination:

said work surface means having a mirror area with a smooth surface;

focussing means optically interposed between said laser and said work surface means for focussing said read beam on said work surface means;

positioning means connected to said work surface means for laterally positioning said work surface means with respect to said read beam for enabling said read beam to scan any portion of said work surface means;

said beam converter converting said reflected light beam to exhibit circular symmetry and having a calibrating light annulus of increased light intensity with respect to predetermined portions of said detectable light beam outside said light annulus such that said calibrating light annulus has a radial extent indicative of focus condition;

calibrating means connected to said array detector, said focussing means and said positioning means, first and second means in said calibrating means respectively connected to said focussing means and to said positioning means, said first and second means both being connected to said array detector, said calibrating means supplying a need signal for indicating that said detectable beam is to be calibrated to said array detector;

said first means responding to said need signal to actuate said positioning means to move said read beam to said mirror area;

focus means in said first means and connected to said focus means for automatically focussing said read beam on said mirror area;

said array comparison means having focus detection means connected to said focus means and to said first means and being responsive to said automatically focusing said read beam on said mirror area for repeatedly measuring and indicating said radial extent of said calibrating light annulus for finding and indicating a minimum one of said indicated radial extent measurements;

best focus means in said first means and connected to said focus detection means for selecting said minimum one of said radial extent measurements for indicating a best focus condition and making said minimum one of said radial extent measurements as a reference radial extent;

said second means being connected to said array comparison means and to said best focus means for responding to said best focus condition indication for actuating said array comparison means for receiving said array signals from said switch array as reference array signals while said focussing means is in said best focus condition; and said reference means being connected to said second means and to said array comparison means for receiving said reference array signals for indicating said desired cross-sectional shape, size and lateral extent.

20. The device set forth in claim 19, including, in combination:

given means for indicating a predetermined recalibration criterion:

said calibration means connected to said given means for responding to said indication of said predetermined recalibration criterion for actuating said recalibration means to recalibrate said detectable beam to said receptor array.

21. An optical detector system, in combination:

optical means for receiving a collimated optical beam having a first predetermined cross-section that is subject to predetermined perturbations that reduce said collimation of said collimated beam;

a beam convertor optically coupled to said optical means for receiving said optical beam for converting said collimated optical beam from said first predetermined cross-section to biaxially symmetrical beam having a second predetermined cross-section that is substantially different than said first predetermined cross-section;

an array detector optically coupled to said beam convertor for receiving said biaxially symmetrical beam, said array detector having a predetermined array of photo receptors, each said photo receptor being a photo cell responsive to impinging light for generating an electrical signal indicative of said impinging light;

said array detector having a predetermined extent lateral to said biaxially symmetrical beam that is substantially greater than said cross-section of said biaxially symmetrical beam;

each said receptor having an extent lateral to said cross-section of said biaxially symmetrical beam that is an order of magnitude less than said cross-section of said biaxially symmetrical beam such that said array detector receives for detection at any one of a plurality of positions in said predetermined extent for detecting said biaxially symmetrical beam; and programmed means connected to said array detector for finding and indicating a lateral position of said biaxially symmetrical beam and for employing said found and indicated lateral position for detecting and indicating said perturbations.

22. The system set forth in claim 21, including, in combination:

said beam convertor comprising a ring lens for making said biaxially symmetrical beam circular with a light annulus of light intensity greater than a light intensity in a central portion of said biaxially symmetrical beam; and said biaxially symmetrical beam has a circular symmetry.

23. The system set forth in claim 21, including, in combination:

said predetermined extent of said array detector being at least twice an extent of said second predetermined cross-section.

24. The system set forth in claim 21, including, in combination:

each of said receptors having an extent for receiving light that is an order of magnitude smaller than an extent of said second predetermined cross-section.

25. The system set forth in claim 21, including, in combination:

said beam convertor comprising a ring lens for making said biaxially symmetrical beam circular with a light annulus of light intensity greater than a light intensity in a central portion of said biaxially symmetrical beam;

said collimated optical beam being subjected to modulations that decrease collimation; and said ring lens passing said collimated optical beam without substantial refraction and responding to said decreased collimation for passing said collimated optical beam with predetermined refraction indicative of said modulations.

26. The system set forth in claim 25, including, in combination:

said array detector having a switch array of switches, said switches being respectively connected to said photo receptors for responding to the respective photo receptors said generated electrical signals; and said programmed means connected to said switches for selectively actuating said switches in a predetermined sequence for scanning said photo receptors for outputting said generated electrical signals in a predetermined sequence.

27. The system set forth in claim 26, including in combination:

an integrated circuit chip comprising said array detector and having internal circuit connections between said photo receptors and said switches, respectively.

28. A method of calibrating physical location of a reflected light beam impinging on an optical detector in an optical device:

including steps of:

providing and mounting an array detector as said optical detector in said optical device;

providing a predetermined array of photo receptors in the array detector;

making said predetermined array to have a light receiving extent substantially greater than a predetermined expected lateral extent of light beams to impinge on said array of receptors;

shining a calibrating light beam having a predetermined cross-sectional shape and size onto a smooth reflective surface;

reflecting the calibrating light beam from said smooth reference surface as a reflected calibrating light beam to said array detector for impinging on said array of photo receptors;

in a first step, finding and indicating a best focus of said reflected light beam;

after said first step, in a second step:
holding said best focus;
scanning said array detector photo receptors for generating reference ones of said array signals, said;
identifying all of said photo receptors receiving and detecting said impinging detectable light beam;
analyzing said identified photo receptors for indicating a shape and location of said received reference detectable light beam; and
selecting said indicated shape and location of said reference detectable light beam as a calibrated reference array of light signals to be used for detecting predetermined modulations in said reflected light beam.

29. The method set forth in claim 28 wherein a central obscuration circle is within said calibrating light annulus: including steps:

in said identifying step, identifying intersecting rows and columns of said photo receptors for generating a rectangular array of said array signals;

then:
first finding and indicating columns of said array signals that include ones of said array signals in said central obscuration circle;

second finding a central one of said columns having a longest portion in said central obscuration circle of any of said found and indicated columns for indicating a vertical axis of said calibrating light annulus;

third measuring the length of said central one of said columns for indicating a vertical outer diameter of said calibrating light annulus and diameter of said central obscuration circle;

fourth finding and indicating rows of said array signals that include ones of said array signal in said central obscuration circle;

fifth finding a central one of said rows having a longest portion in said central obscuration circle of any of said found and indicated rows for indicating a horizontal axis of said calibrating light annulus;

sixth measuring the length of said central one of said rows for indicating a horizontal outer diameter of said calibrating light annulus and diameter of said central obscuration circle;

seventh combining said measured lengths for calculating radii of said calibrating light annulus;

retentively storing in said optical device as said reference annulus said calculated and measured lengths and radii and respective locations of said identified photo receptors.

30. The method set forth in claim 29, including steps:

in said reflecting step, converting said reflected beam to a detectable beam having a beam cross-section and exhibiting predetermined biaxial cross-section indicating focus conditions by respective extents of high light intensity light bars disposed across at least one axis of said biaxial cross-section; and in said first step, measuring axial extent of said light bars for finding a minimal axial extent for indicating said best focus condition.

31. The method set forth in claim 30, including steps:

in said converting step, converting said reflected beam to generate said predetermined biaxial cross-section a circularly symmetrical cross-section for producing said bars as a single circular annular light bar; and in said first step finding a minimum radial extent of said annular bar for indicating said best focus condition.

32. An optical device having a laser for emitting a read beam to a work surface means, said work surface means reflecting said read beam as a reflected beam, said reflected beam having a somewhat first predetermined cross-section, an optical read system in said optical device for receiving said reflected beam, said work surface means modulating said read beam for indicating predetermined spatial relationships between said read beam and said work surface means in said reflected beam, said reflected beam having a predetermined cross-section size:

an improvement, including, in combination:

a detector in said optical read system for receiving said reflected light beam, said detector having a photo-responsive surface means with a lateral extent to said received reflected light beam substantially greater than said cross-section size;

a plurality of photo-responsive photo receptors in said photo-responsive surface means disposed in a predetermined two-dimensional array;

mount means in said optical device fixedly mounting said detector in said optical device;

programmed means connected to said photo receptors for receiving signals indicative of said received reflected light beam;

calibration means in said programmed means for responding to first ones of said received signals for calibrating said detector to said reflected light beam for indicating a best focus and a best lateral location of impingement of said reflected light beam on said photo-responsive surface means; and operation means in said programmed means and connected to said calibration means for responding to said best focus and best lateral location indication and to second ones of said received signals for comparing said first and second ones of said received signals for indicating predetermined differences between said first and second ones of said received signals for indicating focus and lateral position errors of said read beam with respect to said work surface means.

33. In the device set forth in claim 32, in combination:

a beam cross-section converter in said read system for receiving said reflected beam to convert said first predetermined cross-section to a detectable beam having a second predetermined cross-section, said second predetermined cross-section having a predetermined symmetry not present in said reflected beam.

34. In the device set forth in claim 33, in combination:

said beam cross-section converter comprising a ring lens for converting said reflected beam to said detectable beam such that said detectable beam exhibits circular symmetry and said second predetermined cross-section comprising a circular annulus of light; and said calibration means detecting and indicating a minimal cross-sectional width of said circular annulus of light for indicating said best focus.

35. In the device set forth in claim 34, in combination:

said calibration means detecting a predetermined equality of light intensity in said circular annulus of light for detecting and indicating said best lateral location.

36. In the device set forth in claim 32, in combination:

said lateral extent of said photo-responsive means being at least twice said cross-sectional size; and a lateral extent of each of said photo receptors being an order of magnitude less than said cross-sectional size.

* * * * *